US010378346B2

United States Patent

(12) United States Patent
Etchecopar et al.

(10) Patent No.: US 10,378,346 B2
(45) Date of Patent: Aug. 13, 2019

(54) SYSTEMS AND METHODS FOR COMPUTING SURFACE OF FRACTURE PER VOLUME OF ROCK

(71) Applicant: Schlumberger Technology Corporation, Sugar Land, TX (US)

(72) Inventors: Arnaud Etchecopar, La Rochelle (FR); Daniel Quesada, Rueil Malmaison (FR); Isabelle Le Nir, Paris (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 833 days.

(21) Appl. No.: 14/378,973

(22) PCT Filed: Feb. 13, 2013

(86) PCT No.: PCT/US2013/025806
§ 371 (c)(1),
(2) Date: Aug. 15, 2014

(87) PCT Pub. No.: WO2013/122971
PCT Pub. Date: Aug. 22, 2013

(65) Prior Publication Data

US 2016/0003039 A1 Jan. 7, 2016

(30) Foreign Application Priority Data

Feb. 14, 2012 (EP) .................................... 12305162

(51) Int. Cl.
*G01V 3/20* (2006.01)
*E21B 43/26* (2006.01)
(Continued)

(52) U.S. Cl.
CPC .............. *E21B 49/02* (2013.01); *E21B 43/26* (2013.01); *E21B 47/0002* (2013.01); *G01V 3/20* (2013.01)

(58) Field of Classification Search
CPC ........... G01V 3/20; E21B 49/02; E21B 43/26; E21B 47/0002
(Continued)

(56) References Cited

U.S. PATENT DOCUMENTS 6,266,618 B1 7/2001 Ye et al.
2004/0108853 A1 6/2004 Rosthal
(Continued)

FOREIGN PATENT DOCUMENTS

CN 1247603 A 5/2000

OTHER PUBLICATIONS

Bonnet et al, Scaling of Fracture Systems in Geological Media, American Geophysical Union, Reviews of Geophysics, 39, Aug. 3, 2001, p. 347-383.*

(Continued)

*Primary Examiner* — Stephanie E Bloss
(74) *Attorney, Agent, or Firm* — Michael Dae

(57) ABSTRACT

Systems and methods for estimating surface of fracture per volume of rock are provided. The systems include a logging tool, such as a resistivity tool, for generating a borehole image representative of segments of fractures in one or more planes and a processor for estimating surface of fracture per volume of rock ($P_{32}$) from the segments without the need for defining the one or more planes bearing the segments. The methods include using a downhole logging tool, such as a resistivity tool, to collect data corresponding to segments of fractures in one or more planes, and estimating surface of fracture per volume of rock ($P_{32}$) by reconstructing theoretical elliptical fractures from the segment data, calculating length of fracture segment per surface of borehole ($P_{21}$) for the theoretical elliptical fractures, and deriving $P_{32}$ from $P_{21}$.

7 Claims, 11 Drawing Sheets

(51) Int. Cl.
*E21B 47/00* (2012.01)
*E21B 49/02* (2006.01)

(58) Field of Classification Search
USPC .................................................... 702/11
See application file for complete search history.

(56) References Cited

U.S. PATENT DOCUMENTS

| | | | | |
|---|---|---|---|---|
| 2009/0192714 | A1* | 7/2009 | Xue | G01V 3/28 702/7 |
| 2009/0235729 | A1* | 9/2009 | Barthelemy | G01V 11/00 73/152.05 |
| 2010/0312529 | A1 | 12/2010 | Souche et al. | |
| 2011/0064277 | A1 | 3/2011 | Duncan et al. | |
| 2011/0091078 | A1 | 4/2011 | Kherroubi et al. | |
| 2011/0255370 | A1* | 10/2011 | Hirabayashi | G01V 1/284 367/31 |

OTHER PUBLICATIONS

J, Kherroubi, et al, "Fracture Characterization from Borehole Image: A Quantified Approach," AAPG Annual Convention & Exhibition, 2009.

J. Kherroubi, "Automatic Extraction of Natural fracture Traces from Borehole Images," IEEE, 19th International Conference on Pattern Recognition (IAPR), Tampa, FL, USA 2008.

X. Wang, "Stereological Interpretation of Rock Fracture Traces on Borehole Walls and Other Cylindrical Surfaces," 2005, PhD thesis of the Virginia Polytechnic Institute and State University of Blacksburg, VA.

S.M. Luthi, P. Souhaite, "Fracture apertures from electrical borehole scans," Geophysics, vol. 55, No. 7 (Jul. 1990); p. 821-833, 15 Figs.

L. Souche, J. Kherroubi, M. Rotschi, S. Quental, "A Dual Representation for Multi-scale Fracture Network Characterization and Modeling," AAPG Annual Convention&Exhibition, Denver, USA, 2009.

A. Etchecopar, H. Onda, J. Kherroubi, L. Souche, C. Demichel & Y. Wang, "Fracture Reservoir Parameters from Borehole Image Analysis," EAGE/SEG 2007 Research Workshop on Fractured Reservoirs, Perugia, Italy, 2007.

First Office Action issued in related CN application 201380019308.4 dated Mar. 22, 2016, 18 pages.

International Search report and written opinion issued in the related PCT application PCT/US2013/025806, dated Oct. 2, 2013 (13 pages).

International Preliminary Report on Patentability issued in the related PCT application PCT/US2013/025806, dated Aug. 19, 2014 (7 pages).

Extended Search Report issued in the related EP Application 12305162.5, dated Jan. 30, 2013 (13 pages).

Office action issued in the related CN application 201380019308.4, dated Oct. 28, 2016 (6 pages).

* cited by examiner

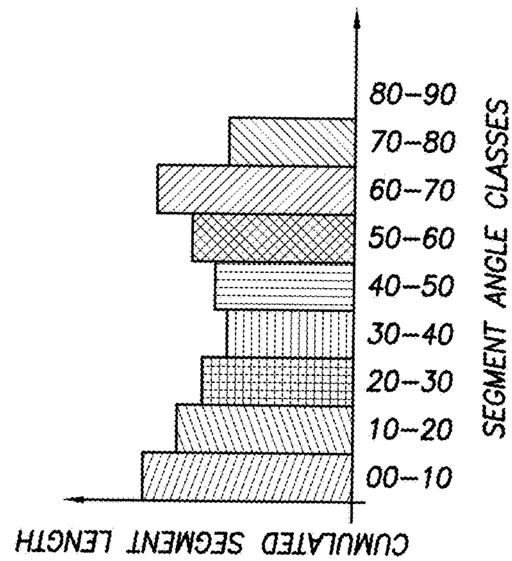
FIG.8
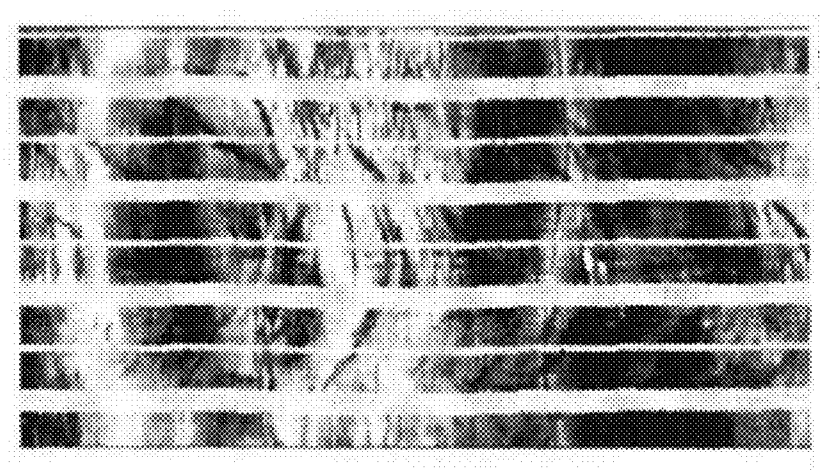

SYSTEMS AND METHODS FOR COMPUTING SURFACE OF FRACTURE PER VOLUME OF ROCK

FIELD

The present disclosure relates to drilling wellbores in subterranean formations. The present disclosure also relates to systems and methods for analyzing borehole productivity.

BACKGROUND

Oil prices continue to rise in part because the demand for oil continues to grow, while stable sources of oil are becoming scarcer. Oil companies continue to develop new tools for generating data from boreholes with the hope of leveraging such data by converting it into meaningful information that may lead to improved production, reduced costs, and/or streamlined operations.

Borehole imagery is a major component of the wireline business (for example, Schlumberger's FMI™, Formation MicroScanner, OBMI™ Tools), and an increasing part of the logging while drilling business (for example, Schlumberger's GeoVision™, RAB Resistivity-at-the-Bit, ARC5 Array Resistivity Compensated tools). While borehole imagery provides measurements containing abundant data about the subsurface, it remains a challenge to extract the geological and petrophysical knowledge contained therein. Yet, accurately characterizing the natural fracture porosity of a hydrocarbon reservoir is an essential step to assessing its productivity index and quantity of oil therein.

SUMMARY

The present disclosure relates to methods and systems for analyzing raw data from borehole imagery tools, for example analyzing zonal resistivity maps generated from measurements of certain resistivity tools, and converting the data into information relating to well productivity.

In some embodiments, the methods involve estimating surface fracture per volume of rock from a borehole image taken in a borehole which has segments of fractures occupying one or more planes, wherein the estimation does not require defining the one or more planes bearing the segments. In some embodiments, the borehole image is in the form of a zonal resistivity map. In some embodiments, the method involves identifying linear segments corresponding to fractures from the borehole image, such as from the zonal resistivity map, sorting the segments into angular classes and generating a cumulated segment length distribution over the angular class, correlating the cumulated segment distribution with a theoretical segment length distribution for each of the angular classes to obtain the length of fracture surface of borehole contribution of each angular class, computing a surface fracture per volume of rock for each angular class from the length of fracture surface of borehole for each class, and summing together the surface fracture per volume of rock for each angular class to arrive at a total surface fracture per volume of rock. In further embodiments, the number of angular classes is nine, and each angular class spans about ten degrees (from 0-10 to 80-90). In some embodiments, the method involves generating a borehole image from data collected by a downhole tool, such as a resistivity tool, and then estimating surface of fracture per volume of rock from the data, wherein the data is correlated to segments of fractures and the estimation does not require defining planes in the borehole bearing the segments.

In some embodiments, the systems include: a downhole tool, such as a resistivity tool, for collecting data in a borehole from which information about segments corresponding to fractures in the subsurface may be derived; and, a processor including machine-readable instruction for estimating surface of fracture per volume of rock from the data (directly or indirectly), without defining the planes in the borehole bearing the segment. In some embodiments, the systems further include machine-readable instructions wherein the estimating includes reconstructing theoretical elliptical fractures from the segment data, calculating the length of fracture per segment per surface of borehole for each of the theoretical ellipses, and deriving a surface of fracture per volume of rock from each length of fracture segment per surface of borehole.

The identified embodiments are exemplary only and are therefore non-limiting. The details of one or more non-limiting embodiments of the invention are set forth in the accompanying drawings and the descriptions below. Other embodiments of the invention should be apparent to those of ordinary skill in the art after consideration of the present disclosure.

BRIEF DESCRIPTION OF DRAWINGS

FIG. 8 is a zonal resistivity map and the related graph of the actual distribution of fracture segments in that map and their angular distribution in nine angular classes.

DETAILED DESCRIPTION

Figure 1:
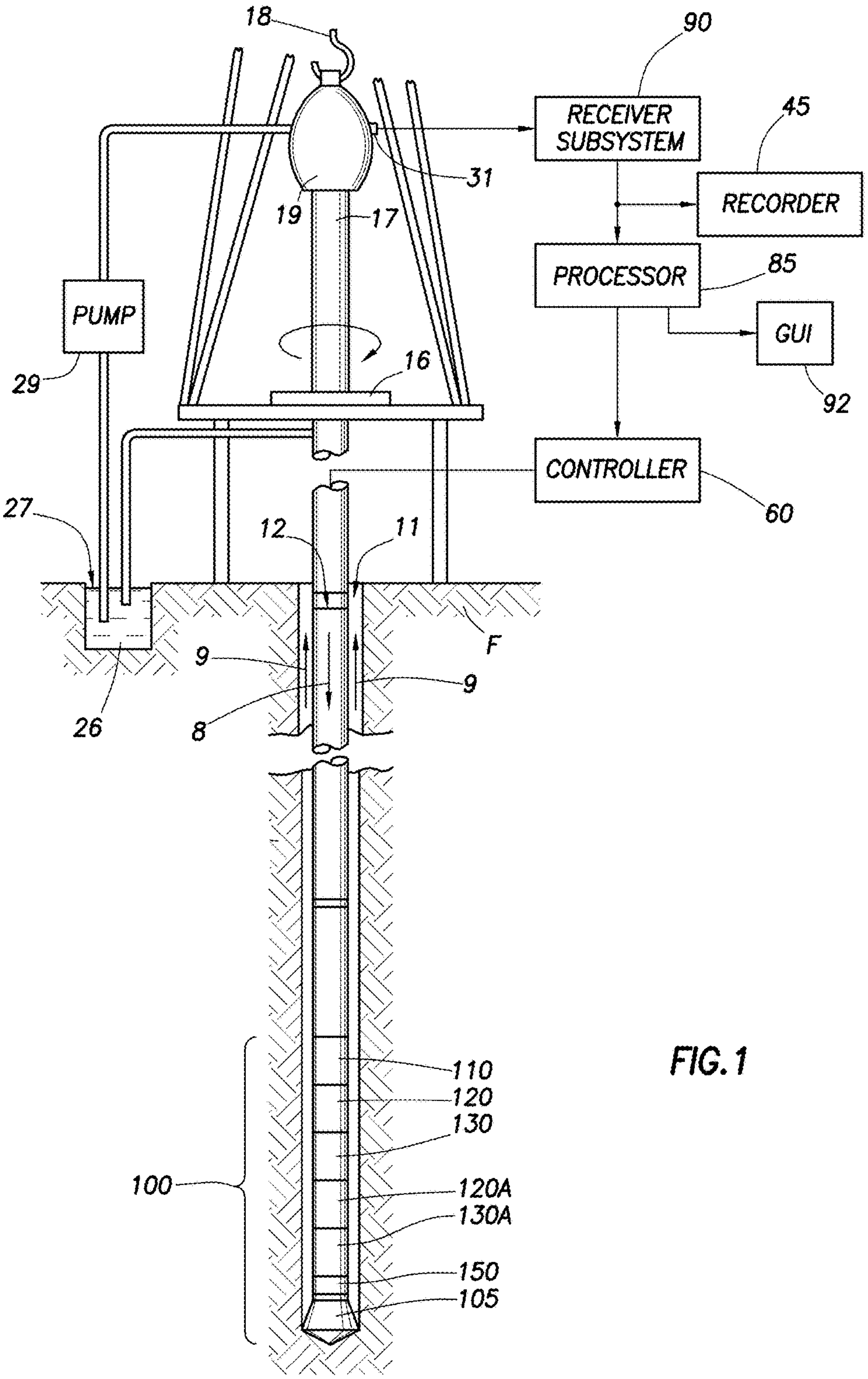
FIG. 1 is a partial schematic representation of an exemplary apparatus for logging while drilling that is compatible with the systems and methods of this disclosure.

Unless defined otherwise, all technical and scientific terms used herein have the same meaning as is commonly understood by one of ordinary skill in the art to which this disclosure belongs. In the event that there is a plurality of definitions for a term herein, those in this section prevail unless stated otherwise.

Where ever the phrases "for example," "such as," "including" and the like are used herein, the phrase "and without limitation" is understood to follow unless explicitly stated otherwise. Therefore, "for example a mud turbine generator" means "for example and without limitation a mud turbine generator."

The terms "comprising" and "including" and "involving" (and similarly "comprises" and "includes" and "involves") are used interchangeably and mean the same thing. Specifically, each of the terms is defined consistent with the common United States patent law definition of "comprising" and is therefore interpreted to be an open term meaning "at least the following" and also interpreted not to exclude additional features, limitations, aspects, etc.

The terms "about" or "substantially" are meant to account for variations due to experimental error, or alternatively to permit deviations from the measured quantity or descriptor that don't negatively impact the intended purpose. All measurements or numbers are implicitly understood to be modified by the word about, even if the measurement or number is not explicitly modified by the word about.

The terms "wellbore" and "borehole" are used interchangeably.

The phrases "bottom hole assembly" and "downhole tool" are used interchangeably.

"Measurement While Drilling" ("MWD") can refer to devices for measuring downhole conditions including the movement and location of the drilling assembly contemporaneously with the drilling of the well. "Logging While Drilling" ("LWD") can refer to devices concentrating more on the measurement of formation parameters. While distinctions may exist between these terms, they are also often used interchangeably. For purposes of this disclosure MWD and LWD are used interchangeably and have the same meaning That is, both terms are understood as related to the collection of downhole information generally, to include, for example, both the collection of information relating to the movement and position of the drilling assembly and the collection of formation parameters.

Whenever the phrase "derived from" or "calculated from" or the like are used, "directly or indirectly" are understood to follow. Also, the phrases "estimating from the data" or "calculating from the data" are understood to mean "from the data or subset of the data." By way of example, a borehole image contains an abundance of data about a borehole. In some embodiments, "estimating surface of fracture per volume of rock" first involves extracting and converting a subset of data—analyzing the data to identify segments, further analyzing which segments correspond to fractures, and estimating proceeds on only the subset of data extracted from the original set which corresponds to segments of fractures.

When a range of angles is provided herein, such as a range of from X degrees to Y degrees, the range is understood to include the lower number ("X") and exclude the upper number ("Y"). Thus, the angular class spans the range of from about 20 degrees to about 30 degrees means that the angular class includes 20 degrees but excludes 30 degrees.

Figure 2:
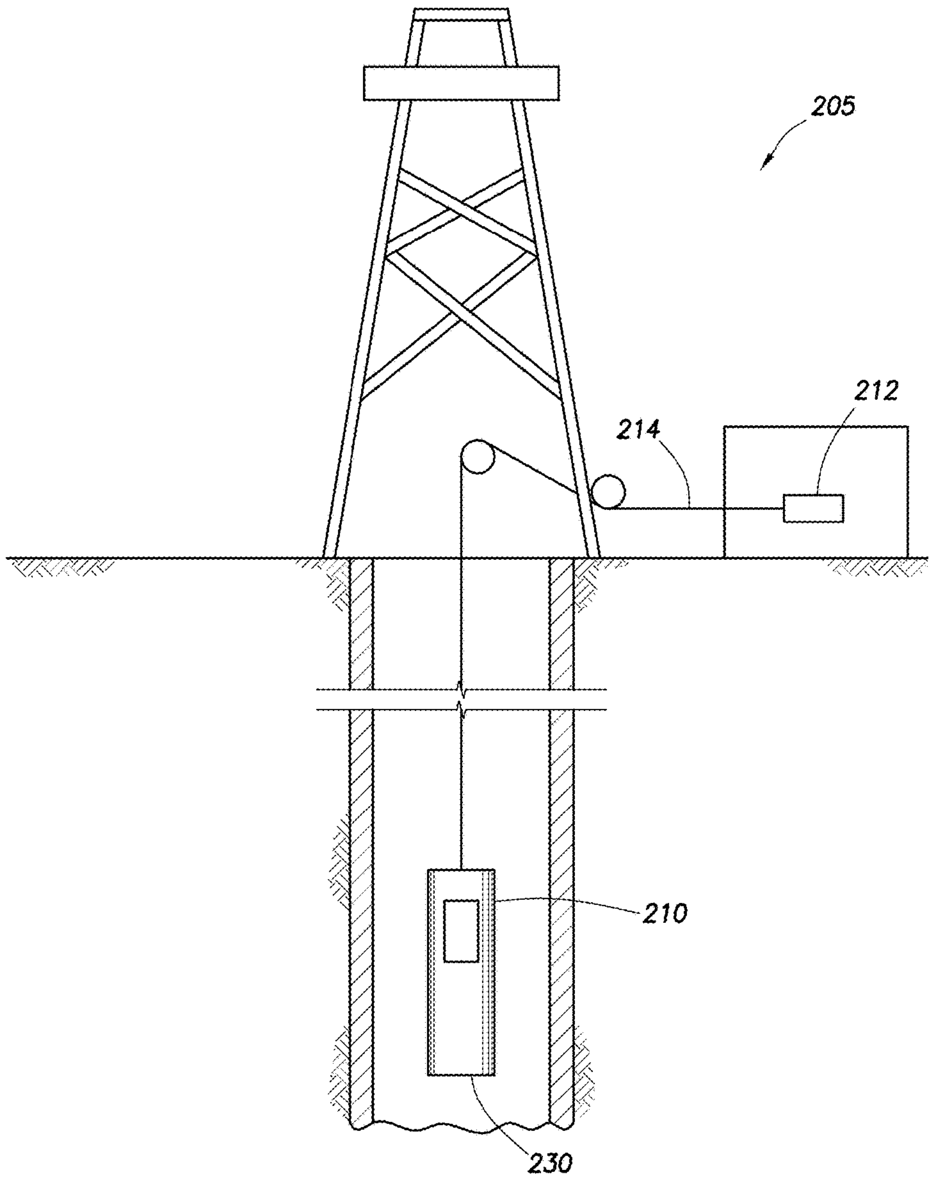
FIG. 2 is a partial schematic representation of an exemplary wireline apparatus that is compatible with the systems and methods of this disclosure.

FIGS. 1 and 2 illustrate non-limiting, exemplary well logging systems used to obtain well logging data and other information, which may be used to estimate surface of fracture per volume of rock and/or analyze borehole productivity in accordance with embodiments of the present disclosure.

FIG. 1 illustrates a land-based platform and derrick assembly (drilling rig) 10 and drill string 12 with a well logging data acquisition and logging system, positioned over a wellbore 11 for exploring a formation F. In the illustrated embodiment, the wellbore 11 is formed by rotary drilling in a manner that is known in the art. Those of ordinary skill in the art given the benefit of this disclosure will appreciate, however, that the subject matter of this disclosure also finds application in directional drilling applications as well as rotary drilling, and is not limited to land-based rigs. In addition, although a logging while drilling apparatus is illustrated, the subject matter of this disclosure is also applicable to wireline drilling (for example as shown in FIG. 2).

A drill string 12 is suspended within the wellbore 11 and includes a drill bit 105 at its lower end. The drill string 12 is rotated by a rotary table 16, energized by means not shown, which engages a kelly 17 at the upper end of the drill string. The drill string 12 is suspended from a hook 18, attached to a travelling block (also not shown), through the kelly 17 and a rotary swivel 19 which permits rotation of the drill string 12 relative to the hook 18.

Drilling fluid or mud 26 is stored in a pit 27 formed at the well site. A pump 29 delivers the drilling fluid 26 to the interior of the drill string 12 via a port 31 in the swivel 19, inducing the drilling fluid to flow downwardly through the drill string 12 as indicated by the directional arrow 8. The drilling fluid exits the drill string 12 via ports in the drill bit 105, and then circulates upwardly through the region between the outside of the drill string 12 and the wall of the wellbore, called the annulus, as indicated by the direction arrows 9. In this manner, the drilling fluid lubricates the drill bit 105 and carries formation cuttings up to the surface as it is returned to the pit 27 for recirculation.

The drill string 12 further includes a bottomhole assembly ("BHA"), generally referred to as 100, near the drill bit 105 (for example, within several drill collar lengths from the drill bit). The BHA 100 includes capabilities for measuring, processing, and storing information, as well as communicating with the surface. The BHA 100 thus may include, among other things, one or more logging-while-drilling ("LWD") modules 120, 120A and/or one or more measuring-while-drilling ("MWD") modules 130, 130A. The BHA 100 may also include a roto-steerable system and motor 150.

The LWD and/or MWD modules 120, 120A, 130, 130A can be housed in a special type of drill collar, as is known in the art, and can contain one or more types of logging tools for investigating well drilling conditions or formation properties. The logging tools may provide capabilities for measuring, processing, and storing information, as well as for communication with surface equipment.

The BHA 100 may also include a surface/local communications subassembly 110, which may be configured to enable communication between the tools in the LWD and/or MWD modules 120, 120A, 130, 130A and processors at the earth's surface. For example, the subassembly may include a telemetry system that includes an acoustic transmitter that generates an acoustic signal in the drilling fluid (a.k.a. "mud pulse") that is representative of measured downhole parameters. The acoustic signal is received at the surface by instrumentation that can convert the acoustic signals into electronic signals. For example, the generated acoustic signal may be received at the surface by transducers. The output of the transducers may be coupled to an uphole receiving system 90, which demodulates the transmitted signals. The output of the receiving system 90 may be coupled to a computer processor 85 and a recorder 45. The computer processor 85 may be coupled to a monitor, which employs graphical user interface ("GUI") 92 through which the measured downhole parameters and particular results derived therefrom are graphically or otherwise presented to the user. In some embodiments, the data is acquired real-time and communicated to the back-end portion of the data acquisition and logging system. In some embodiments, the well logging data may be acquired and recorded in the memory in downhole tools for later retrieval.

The LWD and MWD modules 120, 120A, 130, 130A may also include an apparatus for generating electrical power to the downhole system. Such an electrical generator may include, for example, a mud turbine generator powered by the flow of the drilling fluid, but other power and/or battery systems may be employed additionally or alternatively.

The well-site system is also shown to include an electronics subsystem comprising a controller 60 and a processor 85, which may optionally be the same processor used for analyzing logging tool data and which together with the controller 60 can serve multiple functions. For example the controller 60 and processor 85 may be used to power and operate the logging tools such as the FMI™ tool mentioned below. The controller and processor need not be on the surface as shown but may be configured in any way known in the art. For example, alternatively, or in addition, as is known in the art, the controller and/or processor may be part of the MWD (or LWD) modules on which the FMI or other tool is positioned or may be on-board the tool itself.

In the methods and systems according to this disclosure, the electronics subsystem (whether located on the surface or sub-surface on or within the tool or some combination thereof) includes machine-readable instructions for estimating surface of fracture per volume of rock ($P_{32}$) from data collected by appropriate logging tools.

FIG. 2 illustrates a wireline logging system 205 suitable for use with the systems and methods of this disclosure. As shown in FIG. 2, a transmitter 210 receives the acquired well logging data from a sensor included in the wireline tool 230. The transmitter 210 communicates the acquired well logging data to a surface processer 212 via a logging cable 214. The logging cable 214 is commonly referred to as a wireline cable. In some embodiments, the processor 212 or a back-end portion (not shown) of the wireline logging system may include a computer system to process the acquired well logging data.

Non-limiting examples of logging tools that may be part of the LWD or MWD modules 120, 120A, 130, 130A and may be useful for generating data useful in systems and methods according to embodiments of the present disclosure include the RAB™ resistivity-at-the-Bit tool, the ARC™ Array Resistivity Compensated tool, and the PERISCOPE™, which are all owned and offered through logging services by Schlumberger, the assignee of the present application. Non-limiting examples of wireline logging tools 230, which may be useful for generating data useful in systems and methods according to the present disclosure include the Formation Microresistivity Imager (FMI™) tool, also owned and offered through logging services by Schlumberger, the assignee of the present application. However, any tool that acquires data relating to fracture segments and from which the length and dip angle of the fracture segment may be extracted may be used in the systems and methods according to this disclosure.

The logging tools referred to in the previous paragraph may be used to generate borehole images of rock and fluid properties. In some embodiments, the tools provide high resolution and nearly complete borehole coverage images—which when "unrolled" and displayed from 0 to 360 degrees, indicate linear features intersecting that borehole as sinusoids. Assuming the images are oriented to geographic north, the amplitude and minimum of the sinusoids can be related to the dip and azimuth of the associated feature.

Figure 3:
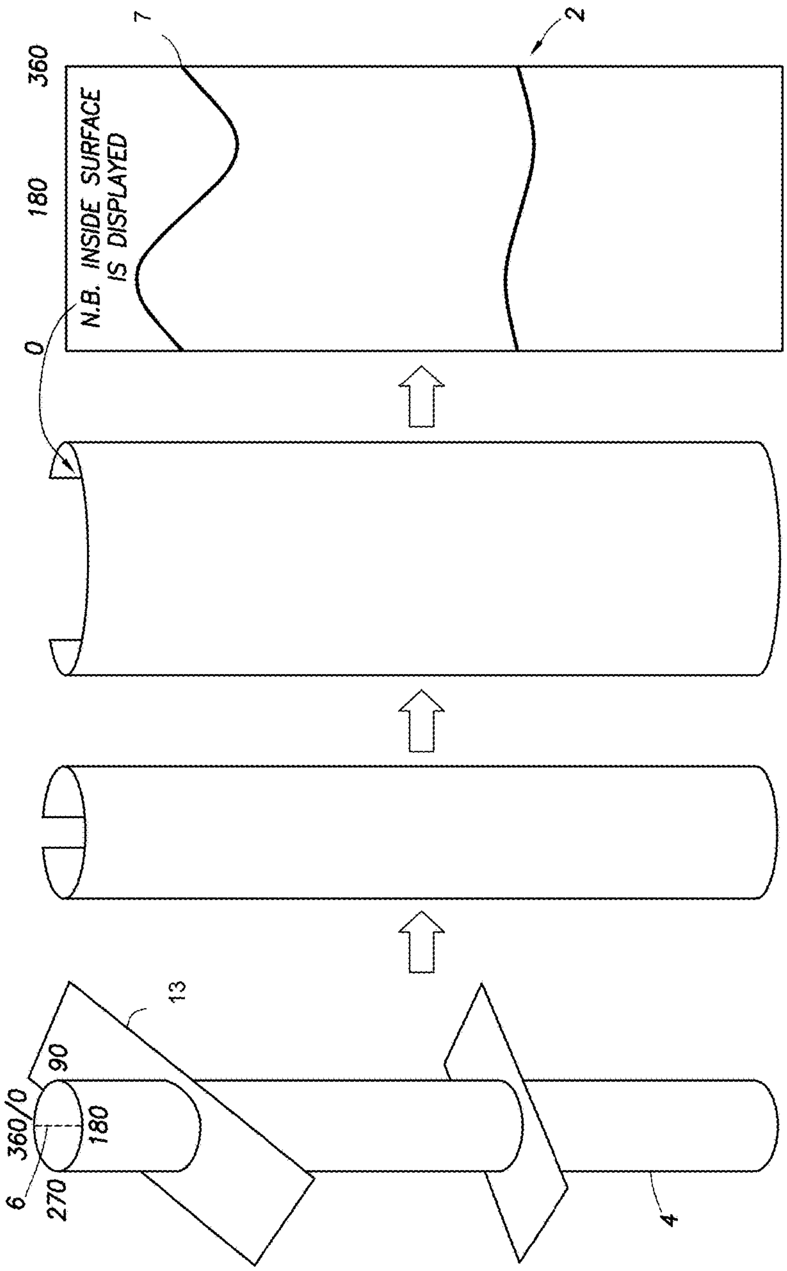
FIG. 3 is a schematic representation of a borehole image illustrating how images from a cylindrical borehole are viewed in two dimensions.

More specifically, FIG. 3, illustrates a borehole image 2 obtained from a cylindrical borehole 4. The image typically is a 2-dimensional representation of the inner surface of the borehole with reference to geographic or true north 6, or in the case of highly angled boreholes (see FIG. 4), to the borehole highside (i.e. upper part of the borehole or top of hole ("TOH")). The dotted line represents true north, or in the case of a highly inclined or horizontal borehole 14, the borehole highside. Any dipping planar features 13 that intersect the borehole 4, therefore, describe a sinusoid 7. And even in the case of an inclined borehole 14, the borehole axis 15 is displayed as though it is vertical. Accordingly, the attitude 16 of the observed sinewave represents the apparent dip.

Figure 4:
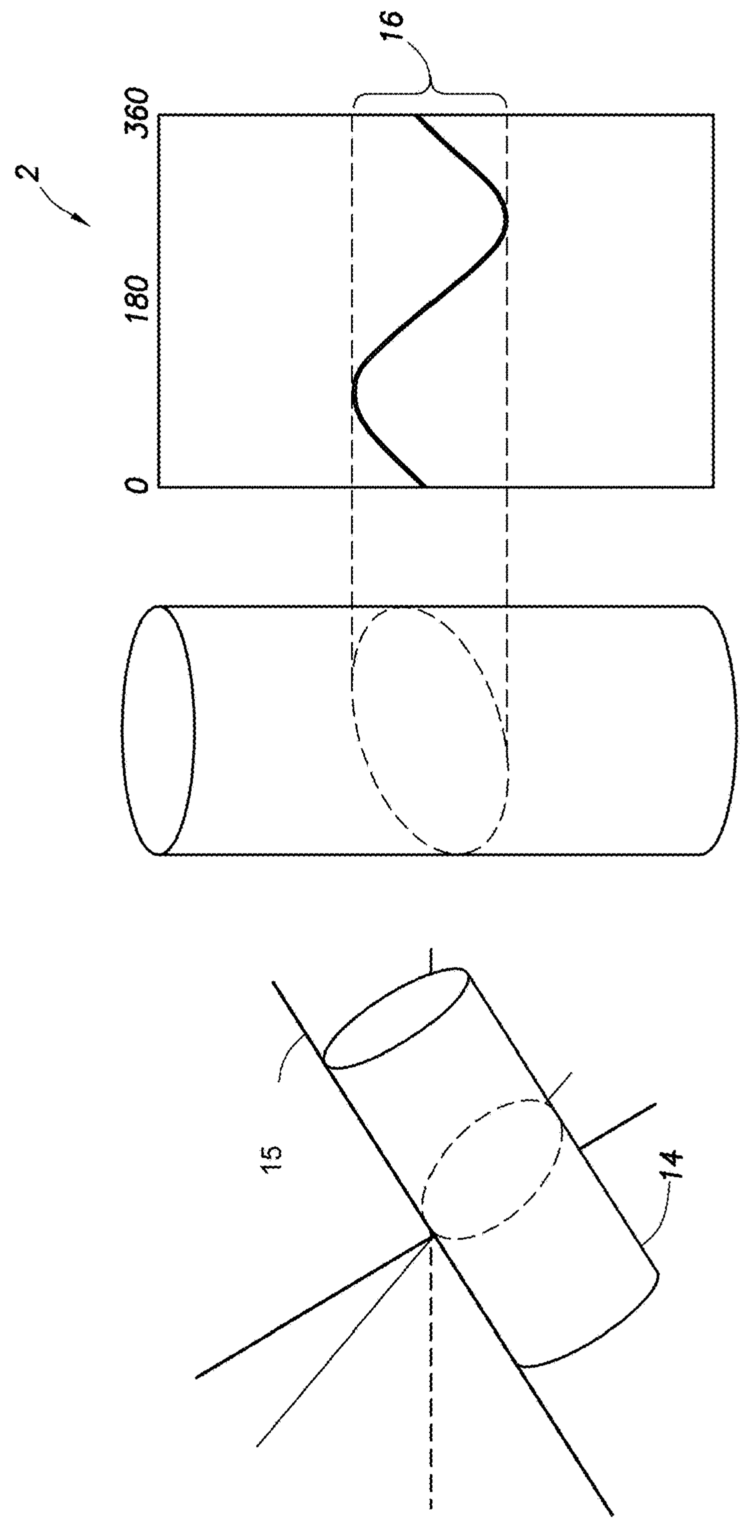
FIG. 4 is a schematic representation of how dipping planes are represented by sinusoids for non-vertical cylindrical boreholes.

Borehole images are generally far more complex than is represented in FIGS. 3 and 4. This is explained, in part, by FIG. 5, which illustrates that, in reality, plenty of intersections between fractures and wells are incomplete ellipses because fractures may be smaller than the well, intersected by the well at their perimeter, or bed or fracture bounded. Further, data collected by appropriate logging tools, such as the FMI™ tool referenced above, is a combined response of a formation that may include various types of features, both incomplete and complete. Decomposition of such complex data distributions into meaningful information about the formation is challenging, for example with respect to determining $P_{32}$.

Josselin Kherroubi and colleagues at Schlumberger, the assignee of the present application, propose a method to automatically extract linear segments from borehole images and evaluate which of those segments belong to fractures. (See, J. Kherroubi, A Etchecopar: "Fracture Characterization from Borehole Image: A Quantified Approach," AAPG Annual Convention & Exhibition, Denver USA 2009 and J. Kherroubi, "Automatic Extraction of Natural Fracture Traces from Borehole Images, 19$^{th}$ International Conference on Pattern Recognition (IAPR), Tampa, Fl, USA, 2008), which are both herein incorporated by reference in their entirety. However, the fracture surface to assess $P_{32}$ cannot be directly calculated because the planes bearing the segments are not defined.

The present disclosure provides systems and methods for evaluating $P_{32}$ after linear segments are extracted from borehole images. Although the Kherroubi et al. approach is mentioned herein for extracting segments of fractures from the borehole image, any methodology for extracting linear segments from the borehole image (or from the borehole data) and/or evaluating whether the segments correspond to fractures can be used as the basis for the further data analysis provided in this disclosure.

In general, in some embodiments, the methods herein are directed at estimating surface of fracture per volume of rock ($P_{32}$) from a borehole image taken in a borehole, which includes data relating to segments of fractures occupying one or more planes, without the need for defining the one or more planes bearing the segments. In some embodiments, the borehole image is in the form of a zonal resistivity map such as can be generated with an FMI™, RAB™ or ARC™ tool as referenced above. In further embodiments, estimating $P_{32}$ involves extracting linear segments corresponding to fractures from the borehole image (e.g. the zonal resistivity map), sorting the segments into angular classes (each angular class, as explained in more detail below, is a grouping of fracture apparent dips and segment angles spanning a predetermined range), generating an actual cumulated segment length distribution over the angular classes, correlating the actual cumulated segment distribution with a theoretical segment length distribution for each of the angular classes to obtain the length of fracture segment per surface of borehole ($P_{21}$) contributions of each angular class ($P_{21}^{(x \rightarrow y)}$), computing a $P_{32}$ for each angular class ($P_{32}^{(x \rightarrow y)}$) from each $P_{21}^{(x \rightarrow y)}$, and summing together the computed $P_{32}$ for each class to arrive at a total $P_{32}(P_{32}^{(tot)})$.

In general, in some embodiments, the systems according to the disclosure include: 1) a downhole tool that acquires data relating to fracture segments and from which the length and dip angle of the fracture segment may be extracted; and 2) a processor including machine-readable instructions for estimating surface of fracture per volume of rock ($P_{32}$) from the data, without the need for defining the one or more planes bearing the segments. In further embodiments, the estimating involves reconstructing theoretical elliptical fractures from the segment data, calculating length of fracture segment per surface of borehole ($P_{21}$) for each of the theoretical elliptical fractures, and deriving $P_{32}$ from $P_{21}$. In yet further embodiments, the processor further includes machine-readable instructions for calculating an actual distribution of cumulative fragment length by angular class and reconstructing theoretical elliptical fractures by correlating the actual distribution of cumulative fragment length with a theoretical distribution of fragment length for each angular class.

Figure 6C:
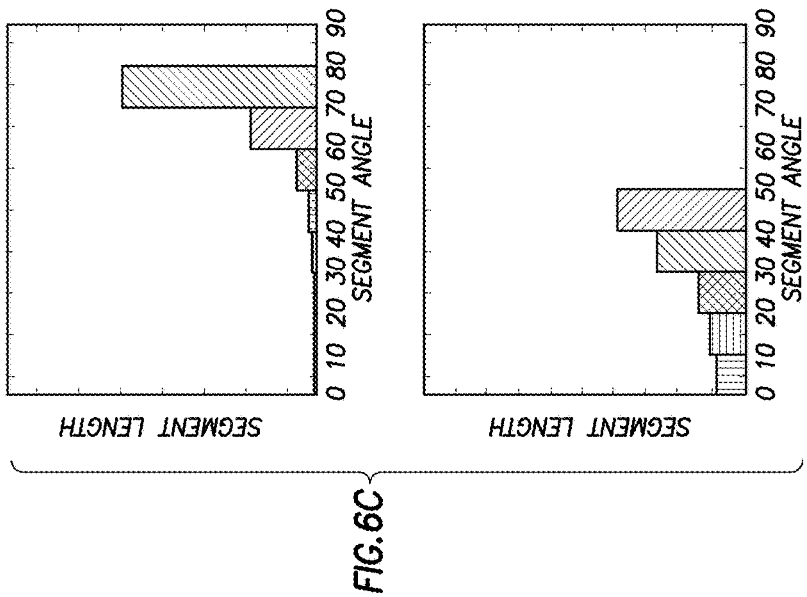
FIG. 6 illustrates the relationship between the intersection of a fracture and the well and segment classes.

FIG. 6 illustrates a baseline concept for generating the theoretical segment length distribution for each of the angular classes. In the example herein, nine angular classes are chosen with equal spans of 10 degrees (ranging from 0-10 to 80-90). However, with respect to the systems and methods disclosed herein, the span of angular classes can be arbitrarily chosen. A larger or smaller number of angular classes can be used, and the classes do not need to be equal in span (i.e. they can have different span widths). In general, precision can be improved by reducing the span of the classes (i.e. increasing the number of classes). At the same time, increasing the number of classes may increase the computational time. At a certain point the additional precision provided by additional classes becomes smaller while the computation effort becomes larger. In addition, image resolution may also contribute to the choice of number of classes and the width of a class (or classes). For example, in some embodiments, the borehole image is acquired by an FMI™ tool with a dip angle resolution of +/−0.1 degree so decreasing the span under such a value would not be meaningful. Understanding these principles, a person of skill can chose a number of classes appropriate for their purposes.

Figure 6B:
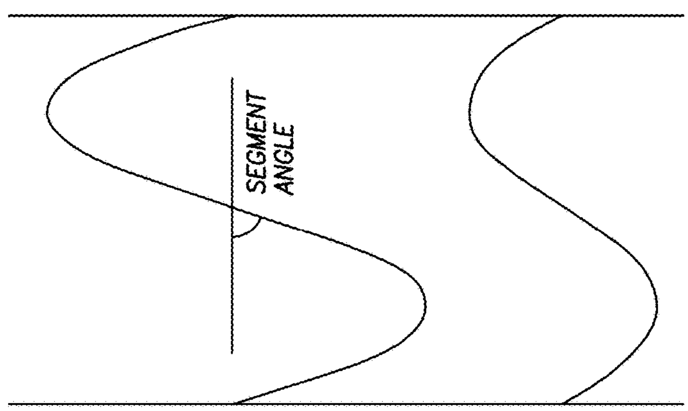
Figure 6A:
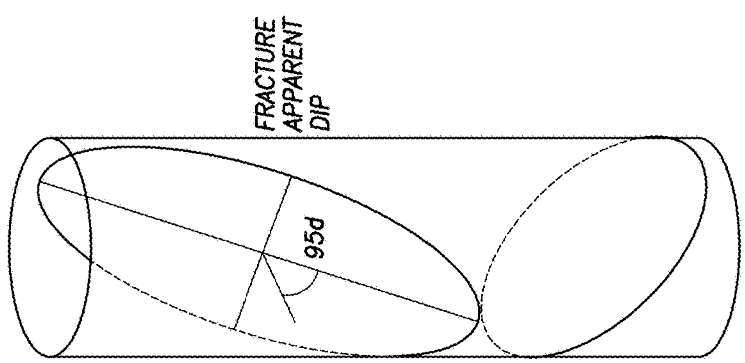

The theoretical segment length distribution means the segment length distribution for complete ellipses spanning an angular class. As a baseline, as shown in FIG. 6, the intersection between a fracture and a borehole can be characterized as a segment collection. The full intersection of a planar fracture and a well corresponds to a complete ellipse, which appears as a sinusoid on a 2D unrolled display (FIG. 6*b*). This sinusoid can be divided into elementary segments, characterized by a length and a segment angle. The "segment angle" is the angle of the segment with respect to the cross-sectional plane (i.e. the horizontal direction on the 2D display).

As previously indicated, for convenience, the segment angles and the fracture apparent dips are gathered into angular classes. The "fracture apparent dip" is the apparent angle of the fracture with respect to the cross-sectional plane (ie 95*d* in FIG. 6*a*). In the example herein, as also previously indicated, angular classes are chosen to span the same width covering 10 degrees each. Therefore, there are nine angular classes ranging from 0- 10 up to 80-90. The distribution of the segment length in these nine classes is unique for each fracture apparent dip, and is further independent of azimuth. As a person of skill may appreciate, 90 degrees itself is excluded from any class because that would correspond to a vertical fracture of infinite length. Therefore the range of a given class includes the lower boundary but excludes the upper boundary. In other words the class ranging, for example, from 20-30 degrees includes 20 degrees but excludes 30 degrees.

Figure 7:
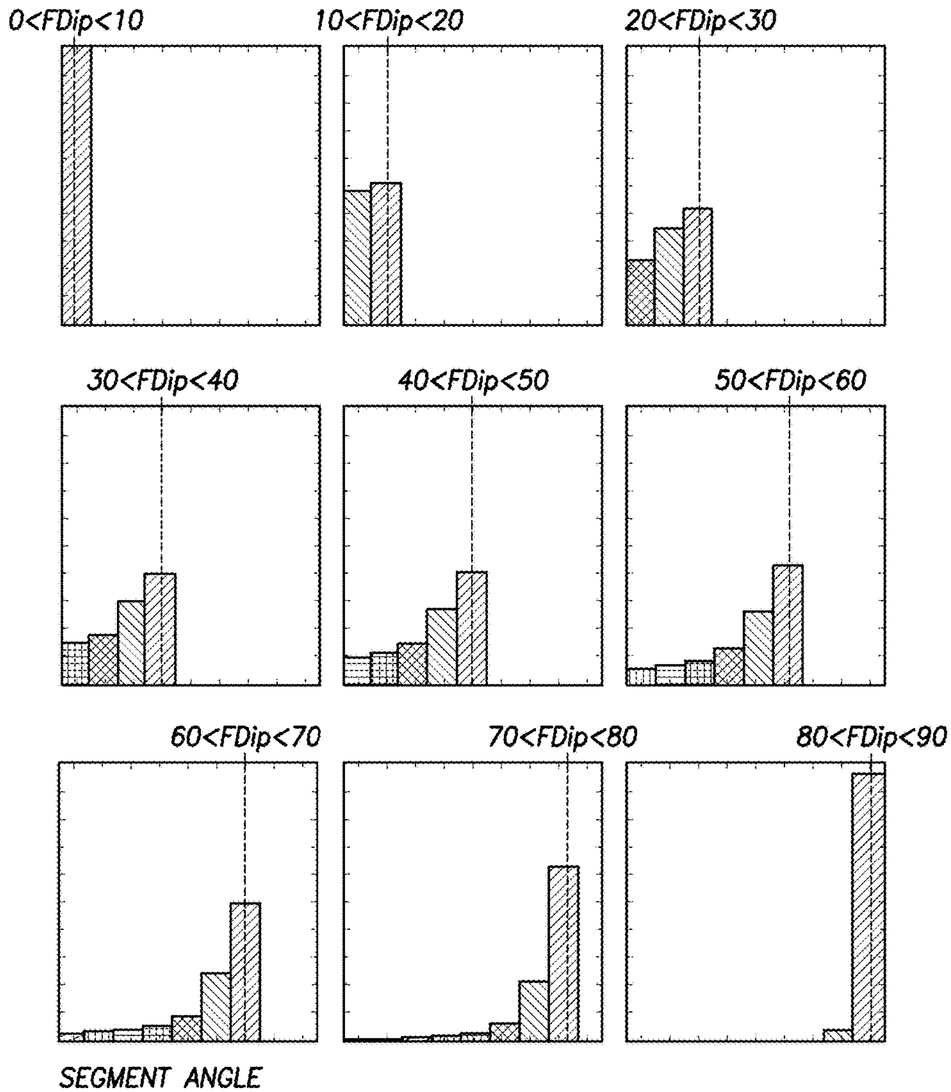
FIG. 7 is a series of graphs showing the theoretical segment length vs. angle distribution for fracture apparent dip when sorted into nine angular classes.

FIG. 7 provides the theoretical distribution of the nine fracture apparent dip classes (i.e. theoretical segment length vs. angle distribution for the nine classes of fracture apparent dip). As is evident, for a given angular class, there are no segments belonging to an angular class above the fracture apparent dip, and there are always segments in the class corresponding to the fracture dip. As a consequence, the segment with the highest dip indicates the dip of the highest fracture plane; in other words, the steepest dipping segments of an actual distribution belongs to fractures with an apparent dip in the same angular class.

Figure 5:
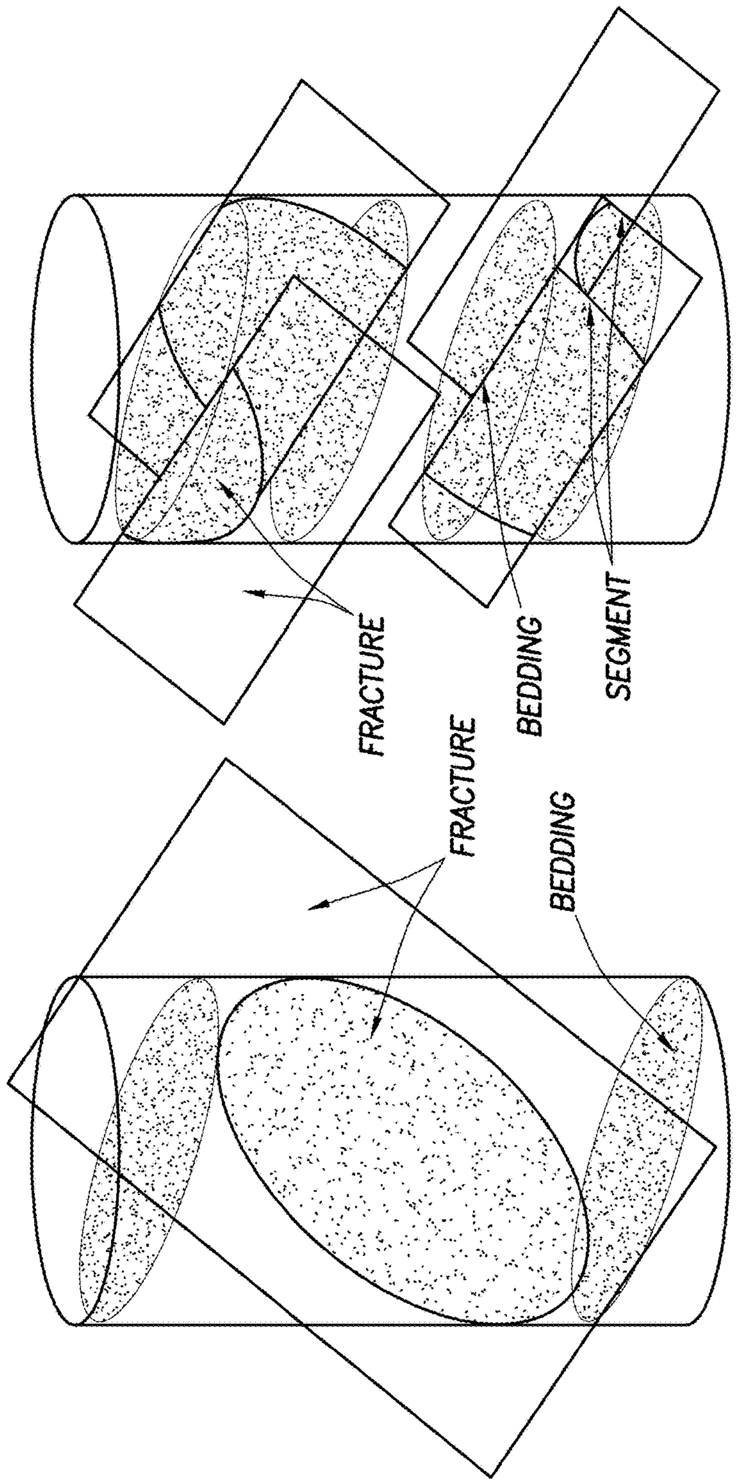
FIG. 5 illustrates the similar segment distributions that can result from both complete or partial sinusoids.

While FIG. 7 provides theoretical distributions computed for complete ellipses, in reality plenty of intersections between fractures and wells are incomplete ellipses because fractures may be smaller than the well, intersected by the well at their perimeter, bed or fracture bounded. The present disclosure assumes that when the number of segments is large, the statistical distribution of their cumulated length vs. angle is independent of fracture dimensions. In other words, the segment distribution for numerous partially-crossing fractures is similar to that obtained for complete ellipses, as illustrated in FIG. 5.

According to the present disclosure, $P_{32}$ is estimated from actual cumulated segment length across angular class by using the theoretical distributions to reconstruct theoretical full ellipses from the collective actual segment fragments. More specifically, linear segments are extracted from the borehole image by any method, for example by the method of Kherroubi et al., referenced above. After the extraction is performed, an effort is made to identify which segments correspond to fractures, for example an interpreter filters and discriminates which of these segments correspond to fractures. The segments are then sorted with respect to the nine angular classes described above (or alternatively the number and type of classes chosen). The cumulated length for each class is then directly calculated, as shown in FIG. 8.

After the actual cumulated segment length versus segment angular class is calculated, theoretical full ellipses are reconstructed and iteratively removed from the data set by correlating the theoretical distribution for each angular class (if it exists) within the actual data set and iteratively removing those theoretical sets from the data set.

More specifically, $P_{21}$ is calculated for the whole segment population by summing the $P_{21}$ contribution of each fracture apparent dip class. The individual contribution of each class is then evaluated. FIG. 9 illustrates an example of such an evaluation, as follows:

1) Identify the highest apparent dip class. With reference to the actual segment distribution shown in FIG. 9A, the highest segment angle class in this particular example is the 70-80 degree class. As previously mentioned, the segments in the highest angle class belong to fractures with similar dip values (70-80 degrees).

Figure 9A:
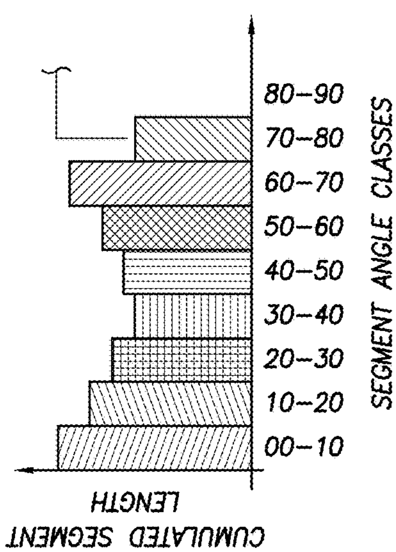
FIGS. 9A-9D illustrate the process of deriving $P_{21}^{(x\rightarrow y)}$.
Figure 9B:
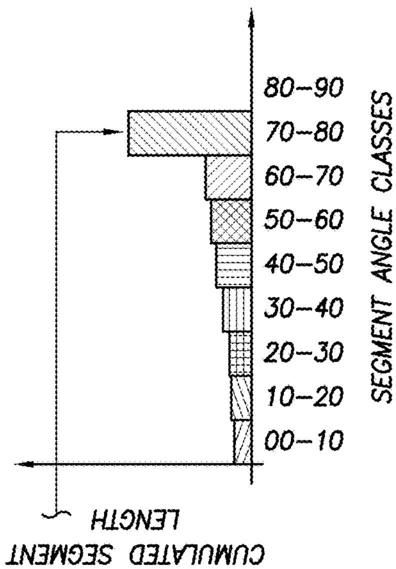
Figure 9C:
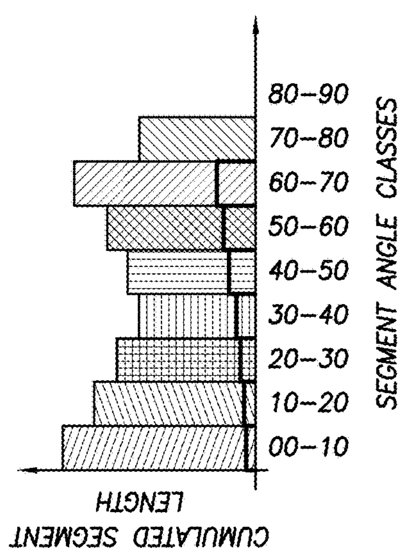
Figure 9D:
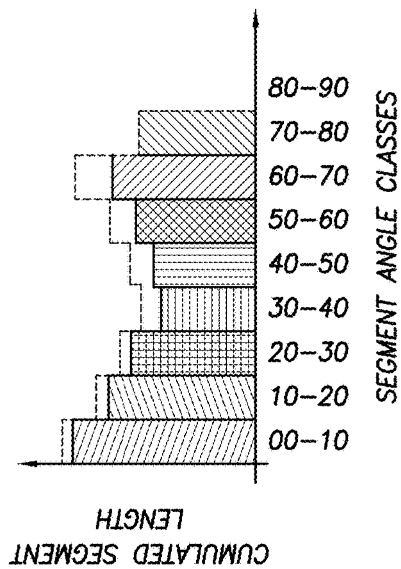

2) Compute the length of segments belonging to the fractures of the highest apparent dip class. As previously discussed, for a particular fracture dip class, we can generate the theoretical segment length distribution. From the borehole image, we also know the actual cumulated segment length in the highest angle class. Therefore, as shown in FIG. 9B, the length of segments belonging to the fractures of the highest apparent dip class can be calculated in each of the lower segment angle classes. The sum of these lengths (including that of the highest segment angle class) gives the individual surface contribution of the fractures with the highest apparent dip. This contribution is denoted $P_{21}^{(70\rightarrow 80)}$. Note that the theoretical distributions do not need to be generated each time the process is performed. Rather the theoretical distributions can be computed once and, for example, can be held in the memory of the processor as a "look up" table to be used as a reference in performing the steps of this process.

3) Remove the correlated data from the actual data set. Once the cumulated length for the highest apparent dip class is classified (in step 2), it is removed from the actual distribution. See FIGS. 9C and 9D.

4) Iteratively perform steps 1-3 for each angular class in descending order. The same process is iteratively carried out to assess the $P_{21}$ from fractures in other apparent dip classes in an angular descending order. Thus, in this example, the process is next carried out for segments for the 60-70 degrees apparent dip class. (After identifying the highest dip class, step 1 becomes identify the next highest dip class.) A small proportion of segments may effectively remain unclassified at the end of the processing (i.e. they are orphan segments that are additional to the determined set of complete ellipses formed by all the other segments). These remainder segments are not included in the fractures surface ($P_{32}$) calculation. However, because these orphan segments are few, any impact (if at all) on the approximation of $P_{32}$ is generally acceptable and to the inventors knowledge still provides the best current approximation of $P_{32}$.

5) Calculate $P_{32}^{(x\rightarrow y)}$. At the end of all the iterations, we have the $P_{21}$ (the length of fracture segment per surface of borehole) contributions of each fracture apparent dip class, from which $P_{32}$ (the surface of fracture per volume of rock) can be derived. A number of methods have been proposed to correlate $P_{21}$ to $P_{32}$ using a "correction coefficient" as follows: $P_{32}=P_{21}*C$. Thus, knowing this ratio (or correction coefficient) and the previously calculated $P_{21}$ contribution of each fracture class, the individual $P_{32}$ for each fracture apparent dip class is calculated as follows: $P_{32}^{(x\rightarrow y)}=P_{21}^{(x\rightarrow y)}\times \text{Ratio}^{(x\rightarrow y)}$.

Figure 10:
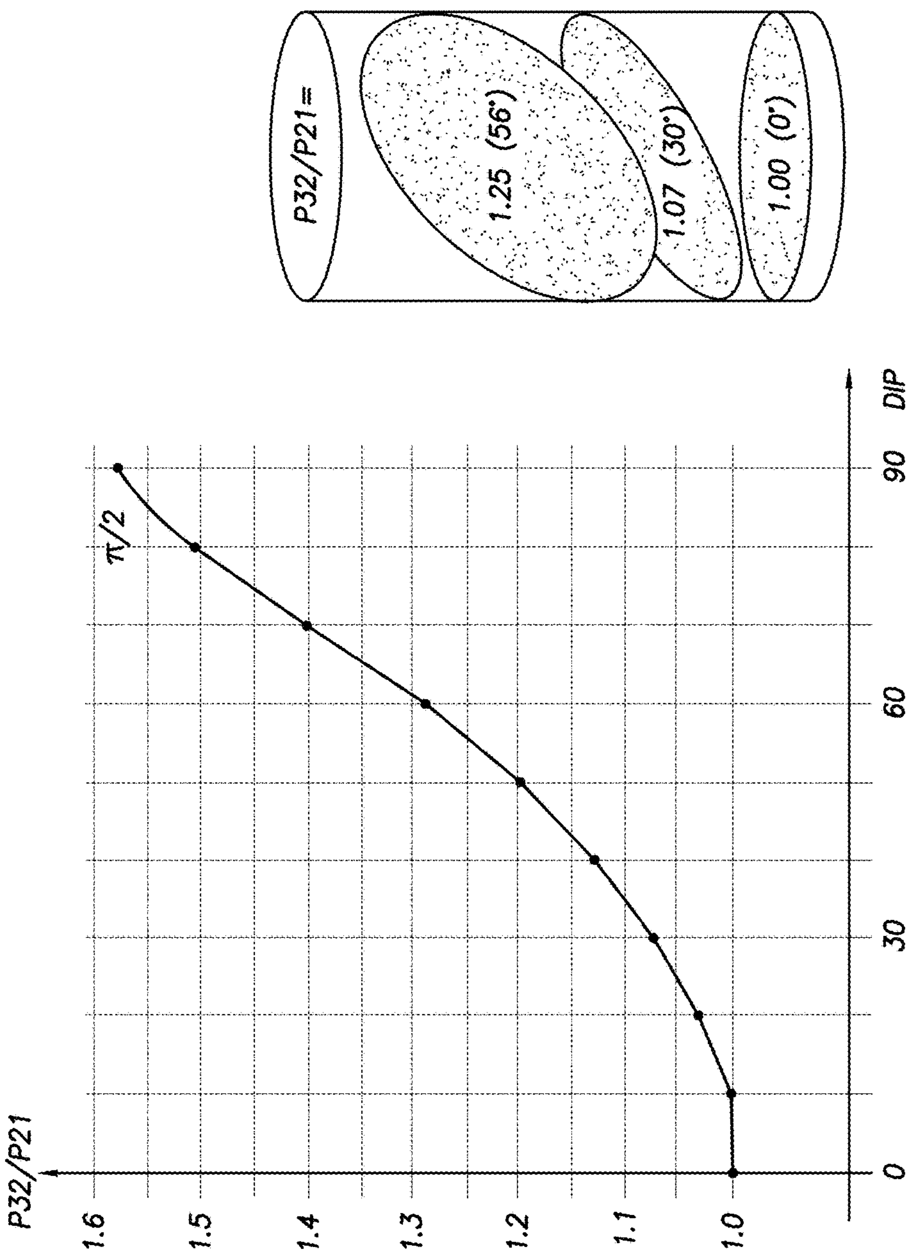
FIG. 10 is a graphic of a methodology for deriving $P_{32}/P_{21}$.

FIG. 10 provides a graph relating the correction coefficient to fracture apparent dip. Xiaohai Wang (2005): "Stereological Interpretation of Rock Fracture Traces on Borehole Walls and Other Cylindrical Surfaces," PhD thesis of the Virginia Polytechnic Institute and State University of Blacksburg, VA, which is hereby incorporated by reference in its entirety, describes one method of deriving this correction coefficient. Another method of calculating the correction coefficient is described below.

Figure 11:
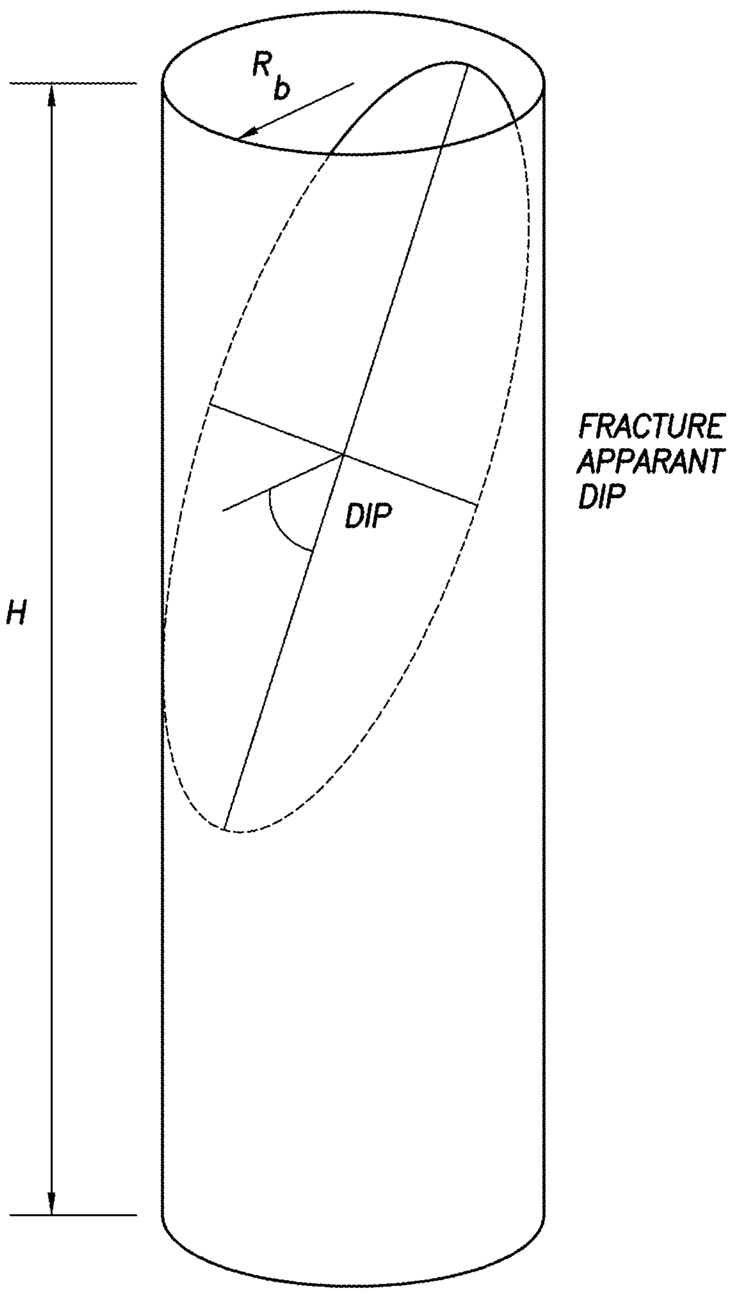
FIG. 11 shows a borehole cylinder of height intersected by a planar fracture

Computation of Correction Coefficient to Account for Dip:

Let us consider a borehole cylinder of height H and radius $R_b$, intersected by a (fully-crossing) planar fracture of apparent dip dip, as shown in FIG. 11 (wherein dip is shown to be 75 degrees).

Calculation of the Fracture Length Per Borehole Surface $P_{21}$

The fracture trace on the borehole wall is a complete ellipse, which perimeter P can be approximated by the Ramanujan I formula as:

$$P\approx\pi[3(a+b)-\sqrt{(3a+b)(a+3b)}], \quad (1)$$

where a is the great radius of the ellipse and b its small radius. In our particular case, those radii are expressed as:

$$a=\frac{R_b}{\cos(\text{dip})} \text{ and } b=R_b \quad (2)$$

Inserting these formulas in (1), we finally obtain:

$$P\approx\frac{\pi R_b}{\cos(\text{dip})}\cdot f, \quad (3)$$

where f is a dimensionless coefficient, defined for $$\text{dip}<\frac{\pi}{2}$$

as:

$$f=3(1+\cos(\text{dip}))-\sqrt{(3+\cos(\text{dip}))(1+3\cos(\text{dip}))} \quad (4)$$

The fracture length per borehole surface $P_{21}$ is defined by:

$$P_{21}=\frac{P}{S_b} \quad (5)$$

where $S_b$ denotes the surface of the borehole cylinder, expressed as:

$$S_b=2\pi R_b H \quad (6)$$

Inserting (3) and (6) into (5), we obtain a very good approximation of $P_{21}$:

$$P_{21}\approx\frac{f}{2H\cos(\text{dip})} \quad (7)$$

Calculation of the Fracture Surface Per Rock Volume $P_{32}$

The surface S of the fracture is calculated from the usual formula expressing the surface of an ellipse:

$$S=\pi ab \quad (8)$$

Replacing again a and b by their respective expressions given in (2), we obtain:

$$S=\frac{\pi R_b^2}{\cos(\text{dip})} \quad (9)$$

The rock volume V initially present in the borehole cylinder before drilling is:

$$V_b=\pi R_b^2 H \quad (10)$$

The fracture surface per rock volume $P_{32}$ is defined by:

$$P_{32}=\frac{S}{V_b} \quad (11)$$

Inserting (9) and (10) into (11), we obtain finally for $P_{32}$:

$$P_{32}=\frac{1}{H\cos(\text{dip})} \quad (12)$$

Calculation of the $P_{32}/P_{21}$ Ratio

The correction coefficient, defined by $C=P_{32}/P_{21}$ is calculated from (7) and (12):

$$C = \frac{P_{32}}{P_{21}} \approx \frac{2}{f}, \qquad (13)$$

which finally results in:

$$C \approx \frac{2}{3(1+\cos(\text{dip})) - \sqrt{(3+\cos(\text{dip}))(1+3\cos(\text{dip}))}} \qquad (14)$$

It has to be noted that (14) is a very good approximation of the exact expression of the $P_{32}/P_{21}$ ratio (featuring a complete elliptical integral of the second kind) defined in Wang. Although in the particular example, the perimeter of an ellipse is approximated by the Ramanuhan I formula, any other formula providing an approximation of the perimeter of an ellipse, for example any other formula providing a very good approximation of the perimeter of an ellipse, can be used in the same manner to derive this coefficient.

The described methods for deriving $P_{32}$ from $P_{21}$ are exemplary only. Any method for analyzing the relationship between $P_{32}$ and $P_{21}$ can be used in accordance with the systems and methods of this disclosure.

6) Calculate $P_{32}^{(tot)}$. The sum of all $P_{32}$ individual contributions gives the overall (cumulated) $P_{32}$ as follows: $P_{32}^{(tot)}=\Sigma(P_{32}^{(0\rightarrow 10)}+ \ldots +P_{32}^{(80\rightarrow 90)})$.

A number of embodiments have been described. Nevertheless it will be understood that various modifications may be made without departing from the spirit and scope of the invention. Accordingly, other embodiments are included as part of the invention and may be encompassed by the attached claims. Furthermore, the foregoing description of various embodiments does not necessarily imply exclusion. For example, "some" embodiments or "other" embodiments may include all or part of "some", "other" and "further" embodiments within the scope of this invention.

What is claimed is:

1. A method, comprising:

a. measuring resistivity of a formation with a resistivity tool and generating a borehole image from resistivity measurements, wherein the borehole image comprises a zonal resistivity map;

b. extracting linear segments corresponding to fractures from the borehole image;

c. defining a set of angular classes;

d. sorting the segments by angular class;

e. calculating a cumulated segment length for each angular class to obtain an actual distribution of cumulated segment length over angular class;

f. correlating the actual cumulated segment length distribution with a theoretical segment length distribution for each of the angular classes to obtain the length of fracture segment per surface of borehole ($P_{21}$) contributions of each angular class ($P_{21}^{(x\rightarrow y)}$);

g. computing a surface of fracture per volume of rock $P_{32}$ for each angular class ($P_{32}^{(x\rightarrow y)}$)from each $P_{21}^{(x\rightarrow y)}$; and, h. summing together the computed $P_{32}^{(x\rightarrow y)}$ to arrive at a total surface of fracture per volume of rock $P_{32}(P_{32}^{(tot)})$.

2. A method according to claim 1, wherein the borehole image is in the form of a zonal resistivity map.

3. A method according to claim 1, wherein the angular classes are nine angular classes.

4. A method according to claim 3, wherein the nine angular classes are first angular class representing a dip class up to 10 degrees, a second angular class representing a dip class from over 10 degrees up to 20 degrees, a third angular class representing a dip class from over 20 degrees up to 30 degrees, a fourth angular class representing a dip class from over 30 degrees up to 40 degrees, a fifth angular class representing a dip class from over 40 degrees up to 50 degrees, a sixth angular class representing a dip class from over 50 degrees up to 60 degrees, a seventh angular class representing a dip class from over 60 degrees up to 70 degrees, an eighth angular class representing a dip class from over 70 degrees up to 80 degrees, and a ninth angular class representing a dip class from over 80 degrees up to 90 degrees.

5. A method according to claim 4, wherein $P_{32}^{(x\rightarrow Y)}$ is derived from a value of the ratio of $P_{32}^{(x\rightarrow y)}/ P_{21}^{(x\rightarrow y)}$ and a value of $P_{21}^{(x\rightarrow Y)}$.

6. A method according to claim 1, wherein the correlating comprises determining $P_{32}^{(x\rightarrow y)}$ in descending order.

7. A system, comprising:

a. a downhole resistivity tool for measuring resistivity of a formation; and, b. a processor including machine-readable instructions for generating a borehole image from resistivity measurements, wherein the borehole image comprises a zonal resistivity map, and estimating surface of fracture per volume of rock ($P_{32}$) from the borehole image wherein the estimation comprises i. extracting linear segments corresponding to fractures from the borehole image;

ii. defining a set of angular classes;

iii. sorting the segments by angular class;

iv. calculating a cumulated segment length for each angular class to obtain an actual distribution of cumulated segment length over angular class;

v. correlating the actual cumulated segment length distribution with a theoretical segment length distribution for each of the angular classes to obtain the length of fracture segment per surface of borehole ($P_{21}$) contributions of each angular class ($P_{21}^{(x\rightarrow y)}$);

vi. computing a surface of fracture per volume of rock $P_{32}$ for each angular class ($P_{32(}^{x\rightarrow y)}$) from each $P_{21}^{(x\rightarrow y)}$; and, vii. summing together the computed $P_{32}^{(x\rightarrow y)}$ to arrive at a total $P_{32}$ ($P_{32}^{(tot)}$).

* * * * *